W. MORRISON.
STORAGE BATTERY ELECTRODE AND PROCESS OF MAKING IT.
APPLICATION FILED OCT. 5, 1911.
1,021,989.
Patented Apr. 2, 1912.
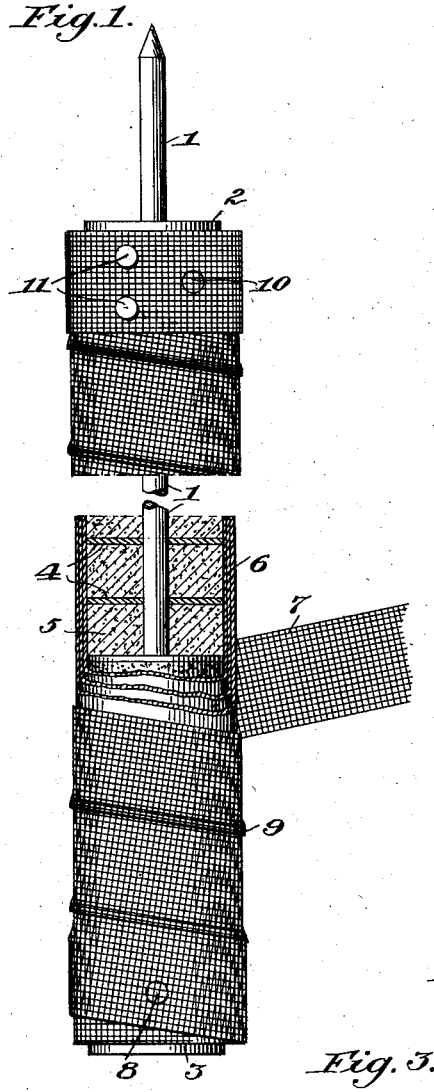
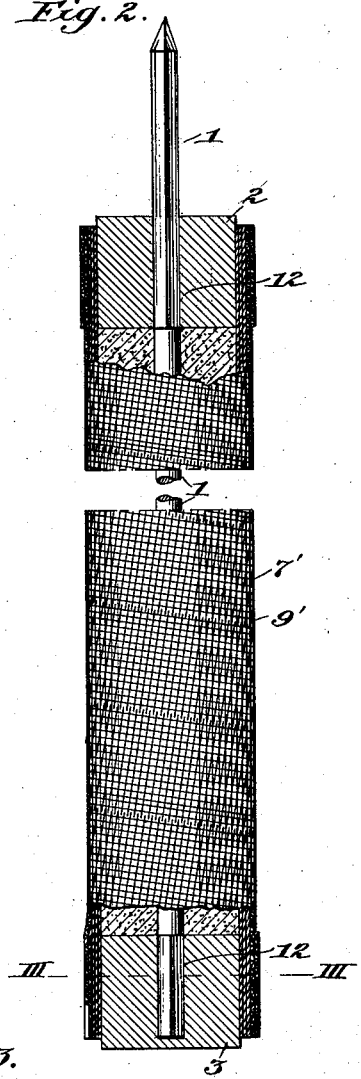
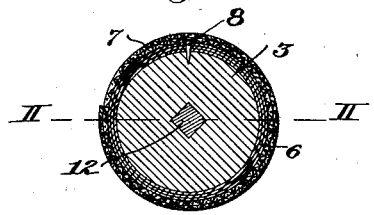
Witnesses:
Inventor:
William Morrison
by Ayres, Townsend & Brickenstein
Att'ys

UNITED STATES PATENT OFFICE.

WILLIAM MORRISON, OF DES MOINES, IOWA.

STORAGE-BATTERY ELECTRODE AND PROCESS OF MAKING IT.

1,021,989.  Specification of Letters Patent.  Patented Apr. 2, 1912.

Application filed October 5, 1911. Serial No. 653,007.

*To all whom it may concern:*

Be it known that I, WILLIAM MORRISON, a citizen of the United States, residing at Des Moines, in the county of Polk and State of Iowa, have invented certain new and useful Improvements in Storage-Battery Electrodes and Processes of Making Them, of which the following is a specification.

In United States Letters Patent No. 976,092, granted to me November 15, 1910, I have illustrated a reversible battery employing an alkaline electrolyte, in which the active material of the negative-pole electrodes is formed into cylindrical rods, externally supported by concentric tubes of heavy paper and woven asbestos, and by a wire wound helically upon the asbestos.

According to the present invention, I support the active material of such electrodes by first inclosing it in a sheath of vegetable parchment resistant to an alkaline solution, and then helically winding on the sheath a strip of wire gauze, with its adjacent edges overlapping or intermeshed.

Two constructions are illustrated in the accompanying drawing, in which—

Figure 1 is a side elevation of an electrode having the wire gauze strip wound with overlapping edges, a portion being broken out and the parchment sheath and wire gauze wrapping being partially removed to show the active material and conductors therein; Fig. 2 is a side elevation of an electrode having the wire gauze strip wound with intermeshed edges, a portion being broken out and the ends being shown in axial section on the line II—II of Fig. 3; and Fig. 3 is a transverse section of the lower end of the second electrode, on the line III—III of Fig. 2.

The electrode illustrated in Fig. 1 comprises a central copper rod 1, the upper end of which constitutes a terminal. A perforated plug 2 of insulating material, for example paraffined wood or vulcanite, fits closely upon the rod near its upper end, and a similar plug 3 incloses the lower end of the rod. A series or perforated copper washers 4 are strung at intervals on the rod, making good electrical contact with it. The active material 5, for example a mixture of zinc chromite, or other zinc-chromium-oxygen compound, and oxid of mercury, is a cylindrical body molded and compressed upon the central rod and washers.

The construction thus far described is that set forth in my specified earlier patent. In the present electrode, the active material is externally supported by a sheath 6 of vegetable parchment, for example a rectangular sheet rolled tightly thereon to form three concentric layers, and by a strip 7 of wire gauze, preferably zinc-plated iron-wire gauze, wound helically on the sheath with its adjacent edges overlapping. In applying this strip, one end is first secured to the plug 3 by a tack 8. The strip is then rolled once upon itself and over the tack, is then wound helically, with engaged slightly overlapping edges 9, over the entire length of the active material, is passed onto and initially secured to the upper plug 2 by a tack 10, and is then rolled once around this plug and over the tack 10, its free end being then permanently secured by tacks 11.

The electrode illustrated in Fig. 2 is identical with the one previosuly described, except that the wire gauze strip 7' is wound with engaged intermeshed edges 9', making a flat joint. For this purpose, one longitudinal wire is previously removed from each edge of the strip, allowing the ends of the cross wires to project. This electrode therefore has a smooth cylindrical surface, free from the helical rib which is caused by overlapping edges. This strip may also be tightly wound in place under less tension than when the edges are overlapped. The intermeshing of the ends of the cross wires prevents successive turns of the strip from shifting peripherally. In order to prevent rotation of the plugs 2 and 3 on the rod 1, the ends 12 of the rod are swaged to a square or other polygonal form, and the plugs are provided with square apertures of the same size to fit them.

The sheath of vegetable parchment permits free access of the battery electrolyte to the active material but entirely prevents the outward escape of any particles thereof. It substantially insulates the wire gauze from the active material, so that, in charging the battery, the hydrogen ions are not liberated on the wire gauze but on the copper rod and washers, thereby effectively reducing the active material. The wound strip of wire gauze constitutes an efficient support and armor for the sheath and active material, preventing the electrode from bulging and deforming as the battery is charged and discharged. The gauze contacts with the parchment at comparatively few points, either a longitudinal or transverse wire being held away from the parchment at every point where the wires cross each other. The wires are thus free to receive any electrolytic or other deposit over nearly their entire surface, thereby holding any deposit or sediment and preventing it from settling to the bottom of the battery vessel.

I claim:

1. A storage-battery electrode, comprising a support and conductor, active material thereon, and wire gauze surrounding but electrically insulated from said active material.

2. A negative-pole storage-battery electrode, comprising a support and conductor, active material thereon, a porous envelop inclosing said active material, and wire gauze surrounding said envelop.

3. A negative-pole electrode for storage batteries having alkaline electrolytes, comprising a support and conductor, active material thereon, a porous envelop of vegetable parchment resistant to alkali inclosing said active material, and wire gauze surrounding said envelop.

4. A storage-battery electrode, comprising a body of active material and a helically-wound strip of wire gauze inclosing said active material, the adjacent edges of said strip being intermeshed.

5. A storage-battery electrode, comprising a body of active material, a porous envelop inclosing said active material, and a strip of wire gauze helically wound on said envelop.

6. A storage-battery electrode, comprising a body of active material, a porous envelop inclosing said active material, and a strip of wire gauze helically wound on said envelop, with its adjacent edges engaged.

7. A storage-battery electrode, comprising a body of active material, a porous envelop inclosing said active material, and a strip of wire gauze helically wound on said envelop, with its adjacent edges intermeshed.

8. A storage-battery electrode, comprising a body of active material, a sheath of vegetable parchment inclosing said active material, and a strip of wire gauze helically wound on said sheath, with its adjacent edges intermeshed.

9. A storage-battery electrode, comprising a body of active material, a sheath of vegetable parchment inclosing said active material, and a strip of zinc-plated iron-ware gauze helically wound on said sheath, with its adjacent edges intermeshed.

10. A storage-battery electrode, comprising a metal rod having squared ends, insulating plugs having square openings seated on said squared ends, active material on said rod between said plugs, and a permeable sheath on said active material, extending over and secured to said plugs.

11. In the process of making storage-battery electrodes, the steps which consist in applying the active material to a support and conductor, and helically winding and securing a strip of wire gauze thereon, with its adjacent edges engaged.

12. In the process of making storage-battery electrodes, the steps which consist in applying the active material to a support and conductor, and helically winding and securing a strip of wire gauze thereon, with its adjacent edges intermeshed.

13. In the process of making storage-battery electrodes, the steps which consist in applying the active material to a support and conductor, inclosing said active material in a porous envelop, and helically winding and securing a strip of wire gauze on said envelop, with its adjacent edges engaged.

14. In the process of making storage-battery electrodes, the steps which consist in applying the active material to a support and conductor, inclosing said active material in a porous envelop, and helically winding and securing a strip of wire gauze on said envelop, with its adjacent edges intermeshed.

In testimony whereof I affix my signature in presence of two witnesses.

WILLIAM MORRISON.

Witnesses:
N. P. LEONARD,
E. DANIELS.

It is hereby certified that in Letters Patent No. 1,021,989, granted April 2, 1912, upon the application of William Morrison, of Des Moines, Iowa, for an improvement in "Storage-Battery Electrodes and Processes of Making Them," errors appear in the printed specification requiring correction as follows: Page 1, line 78, for the word "previosuly" read *previously;* page 2, line 57, for the compound word "iron-ware" read *iron-wire;* and that the said Letters Patent should be read with these corrections therein that the same may conform to the record of the case in the Patent Office.

Signed and sealed this 21st day of May, A. D., 1912.

[SEAL.]

C. C. BILLINGS,
*Acting Commissioner of Patents.*